US008626425B2

(12) United States Patent
Gibson et al.

(10) Patent No.: US 8,626,425 B2
(45) Date of Patent: *Jan. 7, 2014

(54) METHOD FOR FUELING AN ENGINE AT START

(71) Applicant: Ford Global Technologies, LLC, Dearborn, MI (US)

(72) Inventors: Alex O'Connor Gibson, Ann Arbor, MI (US); Jeffrey Allen Doering, Canton, MI (US); John Eric Rollinger, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/864,074

(22) Filed: Apr. 16, 2013

(65) Prior Publication Data

US 2013/0238227 A1   Sep. 12, 2013

Related U.S. Application Data

(63) Continuation of application No. 13/293,002, filed on Nov. 9, 2011, now Pat. No. 8,423,271.

(51) Int. Cl.
  *F02N 15/00*   (2006.01)

(52) U.S. Cl.
  USPC ......... 701/112; 701/113; 123/179.4; 123/491

(58) Field of Classification Search
  USPC .................. 123/179.4, 491; 701/112, 113
  See application file for complete search history.

(56) References Cited

U.S. PATENT DOCUMENTS

| 7,011,063 | B2 | 3/2006 | Condemine et al. |
|---|---|---|---|
| 7,028,656 | B2 | 4/2006 | Tsuji et al. |
| 7,066,128 | B2 | 6/2006 | Satake et al. |
| 7,269,499 | B2 | 9/2007 | Murakami et al. |
| 7,377,248 | B2 | 5/2008 | Hokuto |
| 7,562,650 | B2 | 7/2009 | Tabata et al. |
| 8,036,817 | B2 | 10/2011 | Ota et al. |
| 2004/0149251 | A1 | 8/2004 | Nishikawa et al. |
| 2008/0091328 | A1 | 4/2008 | Tabata et al. |
| 2010/0204902 | A1 | 8/2010 | Kuroki et al. |

FOREIGN PATENT DOCUMENTS

JP   H01170735 A   7/1989

*Primary Examiner* — Erick Solis
(74) *Attorney, Agent, or Firm* — Julia Voutyras; Alleman Hall McCoy Russell & Tuttle LLP

(57) ABSTRACT

A method for improving starting of an engine that may be repeatedly stopped and started is presented. In one example, fuel injection timing is selectively adjusted based on engine stop position and amount of time the engine is stopped. The method may improve engine starting and lower engine noise.

13 Claims, 6 Drawing Sheets

METHOD FOR FUELING AN ENGINE AT START

CROSS REFERENCE TO RELATED APPLICATIONS

The present application is a continuation of U.S. patent application Ser. No. 13/293,002, filed on Nov. 9, 2011, now U.S. Pat. No. 8,423,271, the entire contents of which are incorporated herein by reference for all purposes.

FIELD

The present description relates to a method and system for improving restarting of an engine. The method may be particularly useful for engines that are stopped automatically and then restarted automatically.

BACKGROUND AND SUMMARY

An engine of a vehicle may be automatically stopped and restarted during periods of time when vehicle motion is not requested or desired by the vehicle operator. By stopping the engine, it may be possible to conserve fuel that would otherwise be consumed if the engine were allowed to continue to operate. However, restarting the engine can increase engine emissions if an undesirable amount of fuel is inducted to engine cylinders. Further, where the engine is a port fueled engine, it may be more difficult to control fuel amounts entering engine cylinders since fuel can only enter the cylinders during times when intake valves of the cylinders are open. Consequently, it may take longer to start an engine that is port injected. One way of decreasing engine starting time of a port fueled engine is to inject fuel to engine cylinders when valves of the cylinders are open during an engine restart. However, injecting fuel during a time when an intake valves are open can reduce fuel vaporization and may cause fuel to impinge on cylinder walls, thereby increasing engine emissions.

The inventors herein have recognized the above-mentioned disadvantages and have developed a method for starting an engine, comprising: during an engine start and after an engine start request, selectively injecting fuel to a port of a single cylinder of the engine having an open intake valve at a time fuel is injected to the port; and injecting fuel to each remaining cylinder of the engine at a time when an intake valve of a cylinder receiving fuel is closed.

By injecting fuel to a single cylinder during intake valve opening of the cylinder, it may be possible to reduce engine emissions and improve engine starting. In particular, after the first cylinder is fueled at a time when its intake valve is open, fuel may be injected to remaining engine cylinders during timing when valves of the remaining cylinders are closed. Open valve injection to the one cylinder allows the cylinder to combust fuel earlier than if fuel injection started at only at closed valve timing. However, the cylinders that subsequently receive fuel can receive fuel when intake valves of the cylinders are closed so that fuel vaporization is improved and so that cylinder wall wetting may be decreased in the remaining cylinders at start. Thus, in one example, only one cylinder is fueled to promote early combustion while all remaining cylinders are fueled to reduce emissions and promote fuel vaporization.

In some examples, the open intake valve injection may be selectively applied. For example, during some conditions open intake valve injection may occur while during other conditions open intake valve injection is not permitted. Specifically, open intake valve injection is permitted when the intake valve opening duration from engine stop position to intake valve closing time (e.g. a remaining amount of intake valve opening duration) is greater than a predetermined number of crankshaft degrees. Selectively injecting fuel based on valve opening timing can reduce engine emissions by reducing the amount of excess fuel in the cylinder port for subsequent ignition events.

The present description may provide several advantages. Specifically, the approach may improve engine emissions by improving cylinder mixtures at engine start time. In addition, the approach may reduce engine noise during starting by helping to ensure that a desired amount of fuel is in a cylinder when combustion is initiated in the cylinder. Further, the approach may reduce excess fueling of engine cylinders during a start so as to reduce engine fuel consumption.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
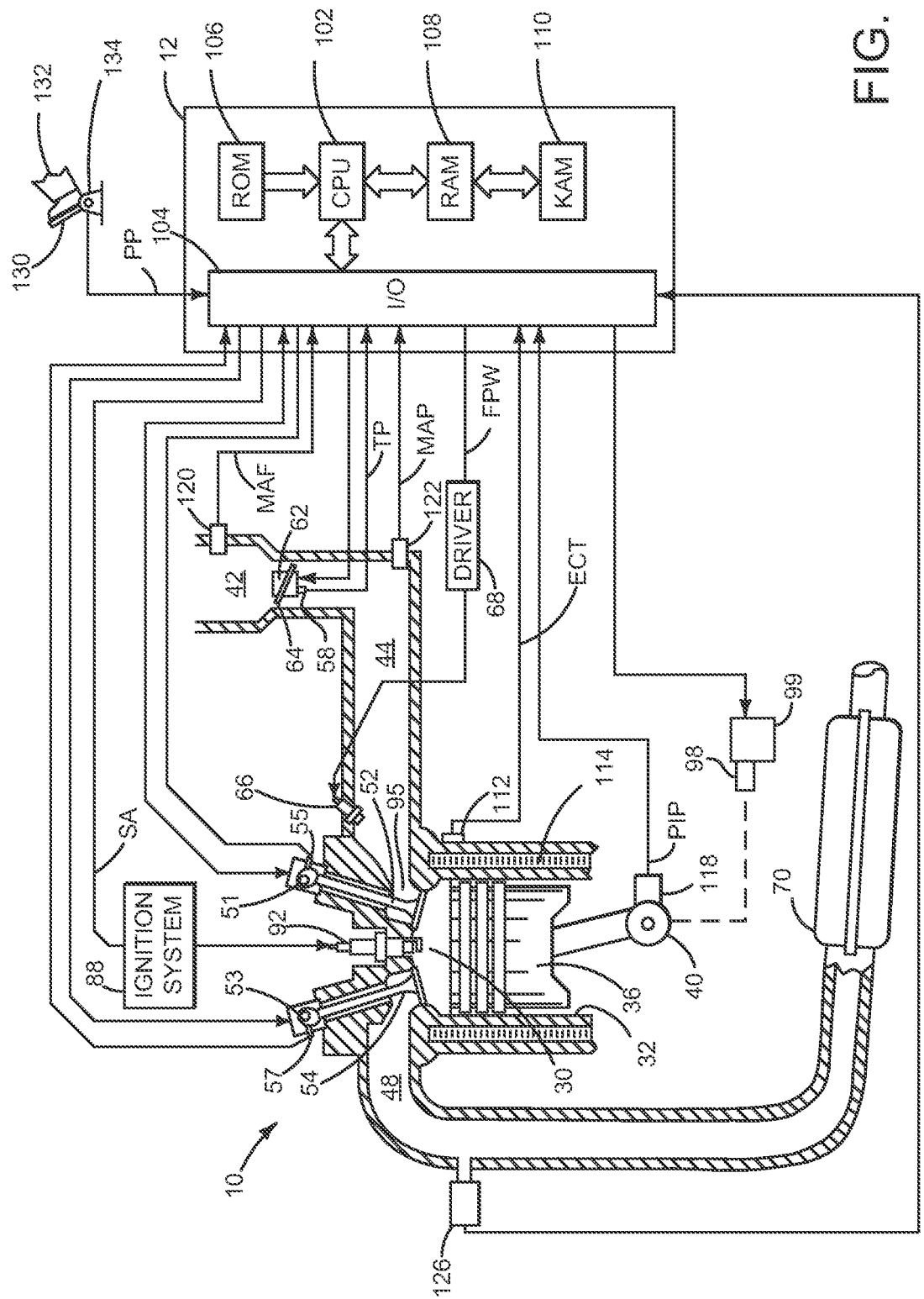
FIG. 1 is a schematic diagram of an engine.

The present description is related to engine fueling during automatically starting an engine. In one non-limiting example, the engine may be configured as illustrated in FIG. 1. Engine starting may be performed according to the sequences described by FIGS. 2-5. The method of FIG. 6 may be executed via controller instructions in a system as shown in FIG. 1 to provide the engine starting sequences shown in FIGS. 2-5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel into an intake port 95 of cylinder 30, which is known to those skilled in the art as port injection. Alternatively, fuel may be injected to combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

Engine 10 may be rotated via engine starter 99 during engine starting. Engine starter 99 may be electrically or hydraulically driven. Engine starter includes pinion 98 which can selectively engage engine 10 via a flywheel (not shown). Controller 12 can automatically selectively rotate engine 10 to start engine 10 after controller 12 automatically stops engine 10. Further, engine starter 99 may be engaged directly via a request via a vehicle operator or driver.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
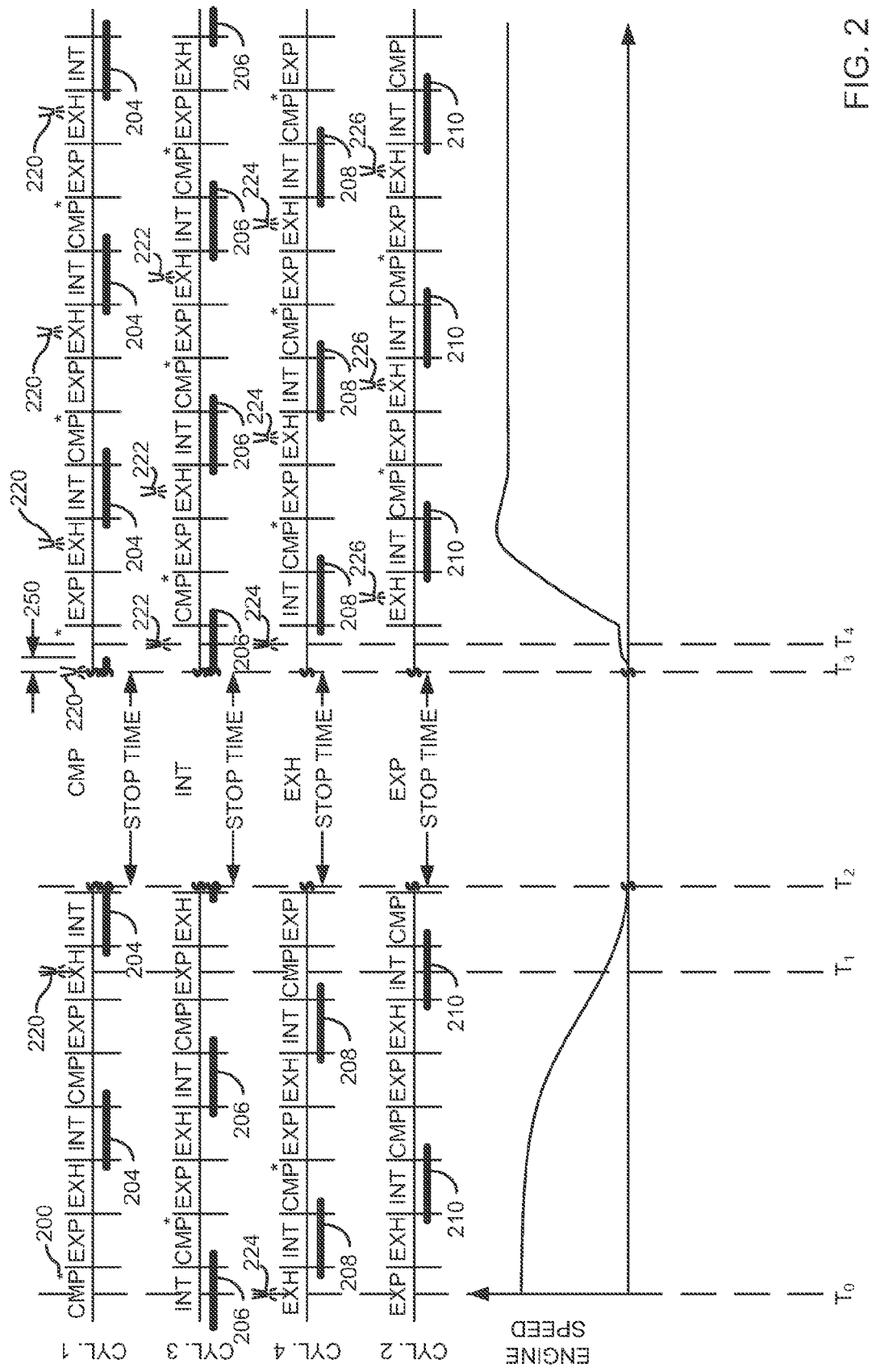
FIGS. 2-5 show example simulated engine starting sequences.
Figure 6:
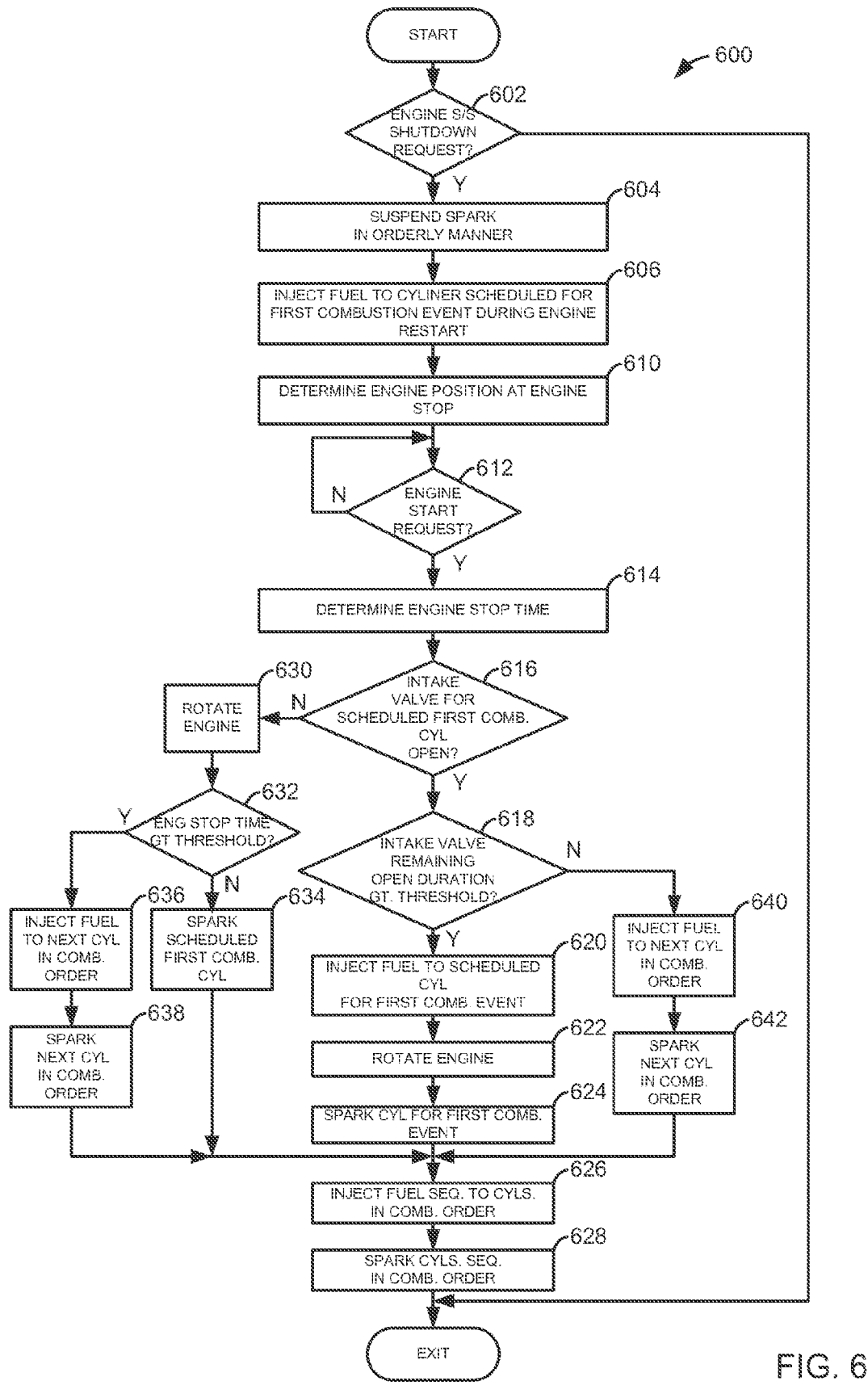
FIG. 6 is a flowchart of an example engine starting method.

Referring to FIG. 2, an example plot of a simulated engine start sequence by the method of FIG. 6 is shown. The illustrated sequence represents a start of a non-limiting four cylinder four cycle engine. The order of cylinder events during engine stopping and starting may depart from the illustration of FIG. 1 without departing from the scope of disclosure. For example, fuel may be injected to cylinder number three instead of cylinder number one and the first combustion event may be initiated in cylinder number three as opposed to cylinder number one without departing from the scope of the description.

In this example, a four cycle, four cylinder engine having a firing order of 1-3-4-2 is shown automatically stopping and starting. Time begins on the left side of the plot and increases to the right side of the plot. In this example, the vertical markers between cylinder position traces CYL. 1-4, represent top-dead-center or bottom-dead-center for the respective cylinder strokes. In addition, there are 180 crankshaft degrees between each vertical marker. It should also be noted that the amount of time between strokes of a cylinder may vary such that the scale of time may expand and contract between the left side and right side of FIG. 2, but the angular interval between cylinder events remains constant. Thus, the X axis for each of the subplots of cylinder events is relative to engine position, except where the engine is stopped as indicated by the SS line brakes and labels. The cylinder strokes are abbreviated as shown where CMP is an abbreviation for compression stroke and EXP is an abbreviation for expansion stroke. Further, exhaust and intake strokes are abbreviated with EXH and INT respectively.

Asterisks such as indicated at 200 provide timing of spark events during the sequence shown. Spark is shown being provided during the compression stroke of the cylinders but spark may also be provided early during the expansion stroke. Injector nozzles with spray such as indicated at 220, 222, 224, and 226 provide timing of fuel injection events for port fuel injectors associated with the cylinder where the injector is shown. For example, at 220, fuel is injected to the intake port of cylinder number one. Intake valve opening timings are shown as wide lines at 204, 206, 208, and 210. In this example, the intake valve opening time extends from during a late portion of the exhaust stroke to an early portion of the compression stroke. However, alternative valve timings of longer or shorter duration are within the scope of this description. Additionally, the valve timings illustrated may be advanced or retarded more than is shown in some examples.

Open intake valve injection occurs in FIG. 2 and FIGS. 3-5 when a center of an injector nozzle is shown above a wide line such as 204 that represents intake valve opening time. Closed intake valve injection occurs in FIG. 2 and FIGS. 3-5 when a center of an injector nozzle is shown above an area without a wide line such as 204.

The first plot from the top of the figure represents position of cylinder number one. And, in particular, the stroke of cylinder number one as the engine crankshaft is rotated from torque provided by a starter motor or combustion within the engine. Strokes of cylinder number one are labeled according to the engine position. For example, cylinder number one is shown on a compression stroke before time $T_0$. After $T_0$, the engine continues to rotate and cylinder number one enters an expansion stroke where gases in the cylinder apply force to move the piston away from the cylinder head. Subsequently, the cylinder enters exhaust and intake strokes. The cylinder cycle for cylinder number one repeats after the engine rotates through a complete cycle. For a four stroke engine, a cylinder cycle may be 720°, the same crankshaft interval for a complete cycle of the engine.

The second cylinder position trace from the top of the figure represents the position and stroke for cylinder number three. Similarly, position traces for cylinder numbers four and two are provided in the third and fourth plots from the top of FIG. 2. The fifth plot from the top of FIG. 2 represents engine speed during the automatic engine starting and stopping sequence.

To the left of $T_0$, the engine is rotating at idle speed, for example. At time $T_0$, an engine controller (e.g., 12 from FIG. 1) requests an automatic engine stop. In particular, the engine stop request is made without an operator directly requesting an engine stop via an engine stop command or request (e.g., via a pushbutton or switch). In one example, the automatic engine stop may be generated when vehicle speed reaches zero while the driver actuates a brake without actuating an accelerator. The engine may be stopped by ceasing to inject fuel and/or provide spark to engine cylinders.

In the example of FIG. 2, the engine is stopped in an orderly manner after the engine stop request at time $T_0$. In particular, engine cylinders that contained an air-fuel mixture prior to the engine stop request are allowed to combust the air-fuel mixture. Further, in engine cylinders where fuel injection was started (e.g., cylinder number four) fuel injection is completed and the air-fuel mixture in the cylinder is combusted as indicated by the spark events after time $T_0$ and before time $T_2$.

At time $T_1$, engine speed approaches zero and the controller judges that cylinder one is to receive a fuel charge so that combustion may be initiated first in cylinder number one during a subsequent engine restart after engine stop. The controller may select a particular cylinder to receive fuel without sparking during an engine stop based on engine position and engine speed. For example, if engine speed is less than 100 RPM and engine cylinder number one is in an intake stroke about to enter a compression stroke, cylinder number one may be selected or judged to be a cylinder for a first combustion event during a subsequent engine restart. In this way, the controller provides fuel to a cylinder during engine stop so that the fuel may be used to start the engine upon request at a later time.

In the example of FIG. 2, cylinder number one is selected to receive fuel before an engine stop and fuel is injected at time $T_1$. Since the engine is port injected, the selected cylinder has to be a cylinder that will open an intake valve to induct the injected fuel, and it is desired that the fuel is not expelled to the exhaust before the engine is stopped. In other words, the cylinder to receive fuel for initiating a first combustion event during a subsequent engine start receives fuel from a port fuel injector during an open or closed intake valve time period, inducts the fuel to the cylinder via opening the intake valve, and if the engine stops as planned, the fuel is not expelled to the exhaust system via opening an exhaust valve of the cylinder.

At time $T_2$, the engine ceases to rotate and is stopped. The engine comes to rest at a position early in a compression stroke of cylinder number one. Although it may be desirable to retain the last amount of fuel injected in a cylinder by having closed intake and exhaust valves, the engine may stop at a location as shown in FIG. 1 where the intake valve is at least partially open do to engine friction and air amounts trapped in engine cylinders.

The engine remains stopped from time $T_2$ to time $T_3$. Accordingly, the intake valves for cylinders 1-4 remain in their respective states. In particular, intake valves for cylinder numbers one and three remain open.

At time $T_3$, an automatic engine restart is requested. In one example, the automatic engine restart may be initiated when a vehicle operator releases a vehicle brake. If the engine stop time is short, substantially all fuel injected to cylinder number one may remain in cylinder number one. Consequently, the engine may be restarted without injecting additional fuel to cylinder number one, and cylinder number one may be the first cylinder to combust an air fuel mixture since engine stop during a subsequent engine restart. However, when engine stop time is greater than a threshold time, and when the intake valve is open for longer than a threshold amount of crankshaft rotation as indicated at 250 (e.g., equal to or more than 30 crankshaft degrees), an additional amount of fuel may be injected as shown to the cylinder to last receive fuel (e.g., cylinder number one) so that the cylinder is a first cylinder to combust an air-fuel mixture during a subsequent engine restart.

Thus, the system of FIG. 1 provides for a system for starting an engine, comprising: an engine including a plurality of cylinders, each of the plurality of cylinders including intake and exhaust valves; a group of fuel injectors supplying fuel to ports of the plurality of cylinders; and a controller including instructions to stop the engine via stopping fuel and spark delivered to the plurality of cylinders, except for one or more cylinders that receive fuel without spark to aid in engine restarting, the controller including further instructions to selectively combust the fuel in the one or more cylinders that receive fuel without spark during a restart of the engine, the fuel in the one or more cylinders not combusted when a stop time of the engine exceeds a threshold amount of time. In this way, a more robust engine start may be performed by the system.

The system also includes further instructions for combusting fuel in the one or more cylinders when the stop time of the engine is less than a threshold amount of time without injecting additional fuel. The system also includes where the fuel in the one or more cylinders that receive fuel without spark is trapped via closing the intake and exhaust valves. The system further includes instructions to inject fuel to one cylinder of the engine that does not receive fuel without spark before engine stop while a valve of the one cylinder that does not receive fuel without spark before engine stop is open before a first combustion event in the one cylinder that does not receive fuel without spark before engine stop. The system also includes further instructions to inject fuel to each remaining cylinder of the engine at a time when an intake valve of a cylinder receiving fuel is closed. In some examples, the system includes where the controller includes instructions for automatically stopping and starting the engine.

Figure 3:
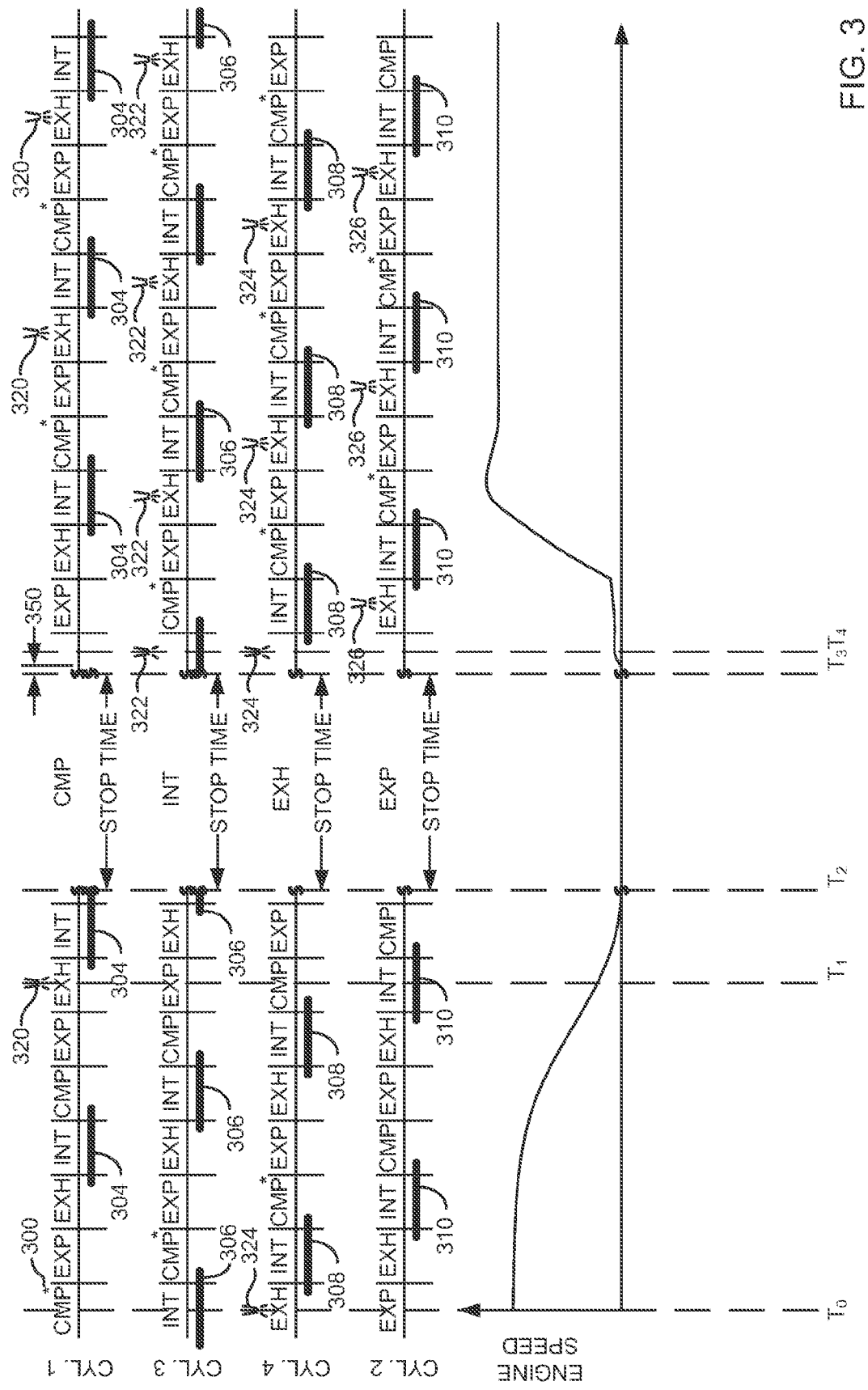

In the example of FIG. 2, fuel is injected to cylinder number one while the intake valve of cylinder one is open in response to a request to restart the engine. In some examples, the fuel may be injected before the starter is engaged to allow the fuel to enter the cylinder while the valve is open. If the intake valve of the cylinder last to receive fuel during an engine stop sequence is in a position where the intake valve is open for less than a predetermined threshold amount of crankshaft rotation (e.g., less than 30 crankshaft degrees), then the engine may be restarted in an alternative manner as shown in FIG. 3. The engine starts to rotate under power of an engine starter at the time right of time $T_3$. Further, the fuel injected at times $T_1$ and $T_3$ is combusted at a time shortly after time $T_4$ as indicated by the asterisk above the cylinder number one plot.

At time $T_4$, fuel is injected to cylinders numbered three and four. In particular, fuel is injected to cylinder number three while the intake valve of cylinder number three is open. Fuel is injected to cylinder number four while the intake valve of cylinder number four is closed. Injecting fuel to cylinder number three while its intake valve is open allows continuity of combustion in the engine firing order. However, if desired, the injection of fuel to cylinder number three may be omitted in some examples so that fuel is only injected to a single cylinder having an open valve before injection is transitioned to injecting fuel on closed valves for all engine cylinders. Injecting fuel to a single cylinder for only the first combustion event of the cylinder during an engine restart may reduce hydrocarbon emissions and cylinder wall wetting.

After time $T_4$, the engine runs up to idle speed and fuel is injected to all engine cylinders when intake valves of the respective cylinders are closed. Injecting fuel when an intake valve is closed can improve fuel and air mixing and reduce cylinder wall wetting by fuel. Thus, engine emissions may be reduced via injecting on closed intake valves after injecting fuel to a single cylinder during time of an intake valve being open.

Referring now to FIG. 3, a sequence similar to the sequence of FIG. 2 is shown. The plots of FIG. 3 are similar to those of FIG. 2, therefore a repeat of some elements common to the figures is omitted and differences between the figures are described.

Spark timing of ignition supplied to each cylinder is indicated by asterisks as shown at 300. Intake valve open timing for cylinder number one is indicated by the wide lines at 304. Similarly, intake valve opening timings for cylinders numbered two through four are indicates at 306, 308, and 310. Port fuel injection timing is shown as indicated by the nozzles at 320, 322, 324, and 326.

At time $T_0$, the engine is rotating at idle speed when an engine stop request is made. The engine is stopped in an orderly manner by ceasing fuel injection and spark to engine cylinders. Specifically, cylinders numbered one, three, and four combust air fuel mixtures that were inducted before the engine stop request at time $T_0$ as indicated by asterisks. The engine speed falls as combustion ceases.

At time $T_1$, fuel is injected to cylinder number one with the intent to trap the fuel in the cylinder to promote rapid engine restarting. The engine continues to rotate and comes to a stop at time $T_2$ where the intake valve of cylinder number one is open, but where the intake valve of cylinder number one will be open for fewer crankshaft degrees when the engine is rotated after the engine start request at time $T_3$ as compared to the number of crankshaft degrees shown in FIG. 2. The number of crankshaft degrees that the intake valve of cylinder number one is open during engine cranking is illustrated at 350. Further, the number of crankshaft degrees that cylinder number one is open during engine cranking is less than a threshold amount where additional fuel may be injected to cylinder number one. Therefore, injection of additional fuel to cylinder number one is omitted when the amount of time the engine is stopped exceeds a threshold. If the engine is stopped for a period of time less than a threshold, combustion may be initiated in cylinder number one via a spark during the compression stroke of cylinder number one after the request to start the engine.

At time $T_3$, a request to automatically start the engine is made. In this example, the time that the engine is stopped (e.g., between times $T_2$ and $T_3$) exceeds a threshold amount and the intake valve is open for less than a threshold amount of crankshaft degrees after engine rotation begins. Consequently, injection of additional fuel to the port of cylinder number one during the time the intake valve of cylinder number one is open since engine stop is omitted in the sequence of FIG. 3. Omitting fuel injection to cylinder number one during the period of short intake valve opening time can reduce the possibility of over fueling cylinder number one during a subsequent cylinder cycle because the second intake event for cylinder number one would not induct two fuel charges. Instead of a small fraction of fuel entering the cylinder and a larger portion of fuel staying in the cylinder port after injecting on an open intake valve in response to a request to start, fuel may be injected for the first time since engine stop upon a second opening of the intake valve of cylinder number one. In this way, the cylinder number one receives only a single fuel charge rather than two fuel charges during the second cycle of cylinder number one. The engine begins to rotate at time $T_3$.

Between time $T_3$ and $T_4$, fuel is injected during open intake valve timing for cylinder number three. Further, fuel is injected during closed intake valve timing for cylinder number four. Thus, after engine stop, fuel is injected to a single cylinder while the cylinder's intake valve is open and then fuel is injected to the respective other cylinders sequentially in order of combustion during times when intake valves of the respective cylinder are closed. For example, the fuel injector supplying fuel to the port of cylinder number two injects fuel during a period when the intake valve of cylinder number two is closed.

After time $T_4$, fuel is injected to engine cylinders during closed intake valve conditions. In addition, combustion is initiated in each cylinder during the respective compression strokes of each cylinder as illustrated. Further, engine speed continues to increase until the engine reaches idle speed.

Figure 4:
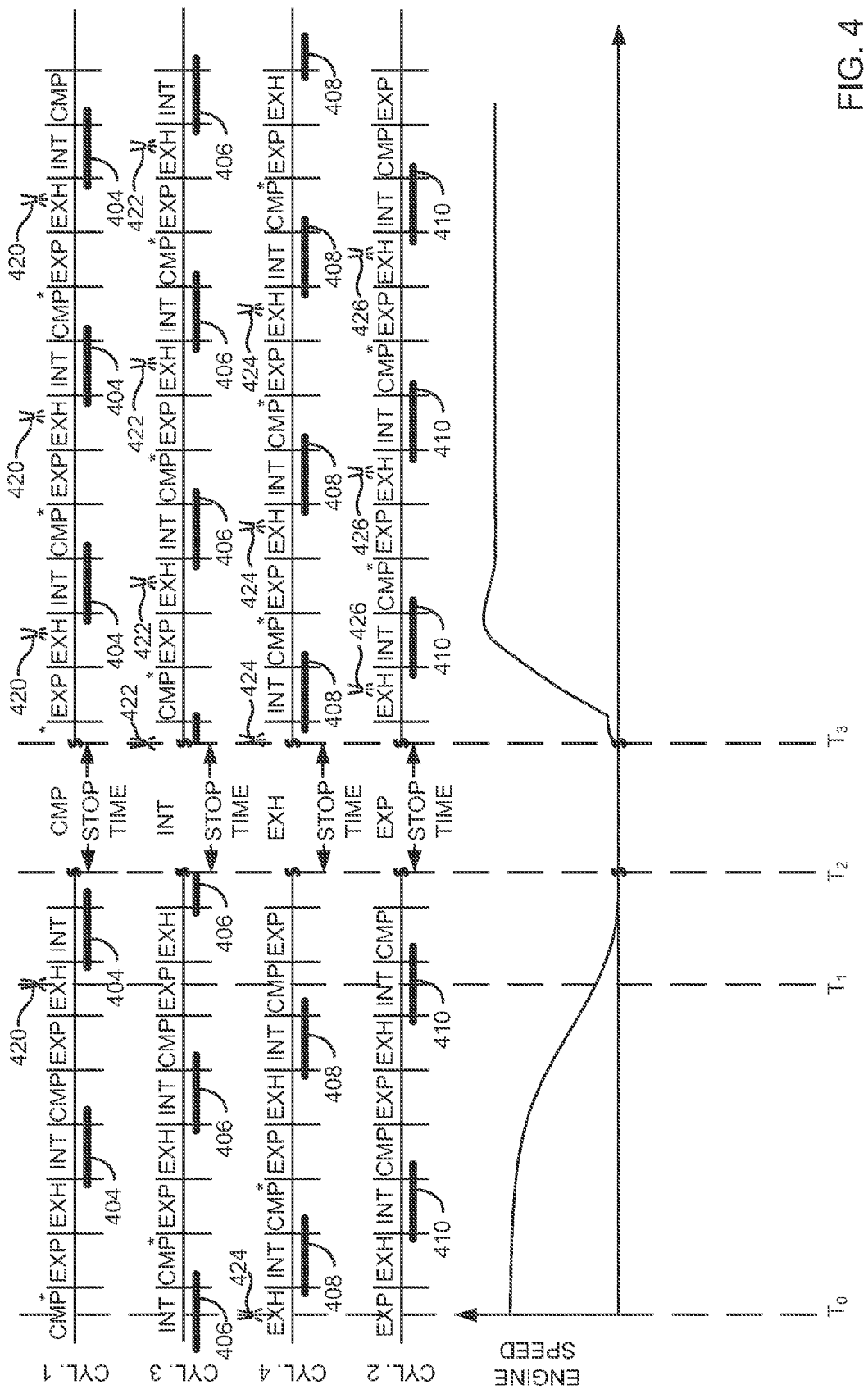

Referring now to FIG. 4, a sequence similar to the sequence of FIGS. 2 and 3 is shown. The plots of FIG. 4 are similar to those of FIG. 2, therefore a repeat of some elements common to the figures is omitted and differences between the figures are described.

Spark timing of ignition supplied to each cylinder is indicated by asterisks as shown at 400. Intake valve open timing for cylinder number one is indicated by the wide lines at 404. Similarly, intake valve opening timings for cylinders numbered two through four are indicates at 406, 408, and 410. Port fuel injection timing is shown as indicated by the nozzles at 420, 422, 424, and 426.

At time $T_0$, the engine is rotating at idle speed when an engine stop request is made. The engine is stopped in an orderly manner by ceasing fuel injection and spark to engine cylinders. Specifically, cylinders numbered one, three, and four combust air-fuel mixtures that were inducted before the engine stop request at time $T_0$ as indicated by asterisks. The engine speed falls as combustion ceases.

At time $T_1$, fuel is injected to cylinder number one with the intent to trap the fuel in the cylinder to promote rapid engine restarting. The engine continues to rotate and comes to a stop at time $T_2$ where the intake valve of cylinder number one is closed and where the fuel injected at time $T_1$ is trapped in the cylinder. None of the other cylinder are shown holding fuel injected during the engine stop procedure. However, in some examples, fuel may be injected to two or more cylinders without igniting the mixtures during an engine stop so that an air-fuel mixture may be combusted in the cylinders without injecting additional fuel to the cylinders during the first two combustion events during a subsequent engine start. Such an injection sequence may be particularly useful for engines having more than four cylinders.

The engine stops at time $T_2$ and the intake valve of cylinder number one is closed trapping an air-fuel mixture in the cylinder. In the example of FIG. 4, cylinder number one stops at the intended time where an air-fuel mixture is trapped in the cylinder to facilitate engine starting. Trapping an air-fuel mixture in a cylinder may be particularly useful in stop/start vehicles where the engine is expected to stop and start with higher frequency. The trapped air-fuel mixture may be applied to start the engine without injecting additional fuel to the cylinder with the trapped air-fuel mixture. In particular, starting may be initiated by simply supplying a spark to the cylinder storing the air-fuel mixture. Thus, engine cranking time may be reduced.

In this example, the time that the engine is stopped is between time $T_2$ and $T_3$. The time between $T_2$ and $T_3$ represents an amount of time less than a threshold amount of time where the air-fuel mixture stored in cylinder number one is substantially disturbed during the engine stop period.

At time $T_3$, an automatic engine start request is made. Since the air-fuel mixture in cylinder number one is not disturbed by air seeping out or crankcase gases seeping into the cylinder, an ignition spark is supplied to cylinder number one after the engine is rotated without injecting additional fuel to cylinder number one during the first cylinder cycle since engine stop. Fuel is also injected to cylinder numbers three and four at time $T_3$. Specifically, fuel is injected during open intake valve timing for cylinder number three and fuel is injected during closed intake valve timing for cylinder number four. Fuel is shown being injected during subsequent cylinder cycles for each cylinder during closed intake valve conditions. Thus, in the example of FIG. 4, a first combustion event is initiated via a single spark, followed by a single open valve injection of fuel into the port of a single cylinder, followed by closed valve injections to the remaining cylinders. Such a sequence may reduce engine emissions and shorten engine starting time by combusting air-fuel mixtures in each cylinder entering a compression stroke from start. In other examples, fuel may be injected so as to trap the air-fuel mixture during in the expansion or intake stroke where it may be subsequently combusted during an engine start. Such an option is also available for the sequences illustrated in FIGS. 2, 3, and 5.

Figure 5:
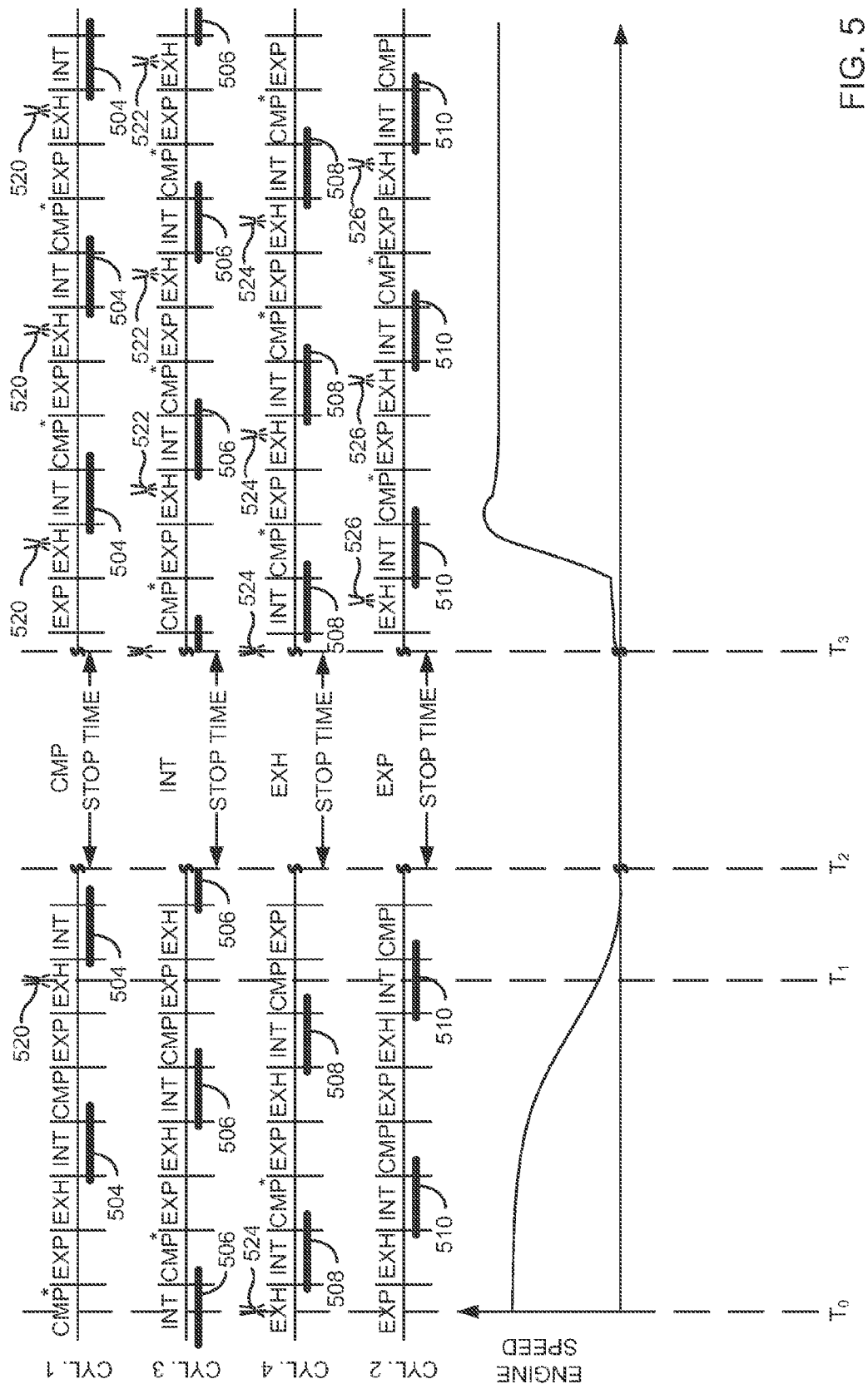

Referring now to FIG. 5, a sequence similar to the sequence of FIGS. 2, 3 and 4 is shown. The plots of FIG. 5 are similar to those of FIG. 2, therefore a repeat of some elements common to the figures is omitted and differences between the figures are described.

Spark timing of ignition supplied to each cylinder is indicated by asterisks as shown at 500. Intake valve open timing for cylinder number one is indicated by the wide lines at 504. Similarly, intake valve opening timings for cylinders numbered two through four are indicates at 506, 508, and 510. Port fuel injection timing is shown as indicated by the nozzles at 520, 522, 524, and 526.

At time $T_0$, the engine is rotating at idle speed when an engine stop request is made. The engine is stopped in an orderly manner by ceasing fuel injection and spark to engine cylinders. Specifically, cylinders numbered one, three, and four combust air-fuel mixtures that were inducted before the engine stop request at time $T_0$ as indicated by asterisks. The engine speed falls as combustion ceases.

At time $T_1$, fuel is injected to cylinder number one with the intent to trap the fuel in the cylinder to promote rapid engine restarting. The engine continues to rotate and stops at time $T_2$ where the intake valve of cylinder number one is closed and where the fuel injected at time $T_1$ is trapped in the cylinder. None of the other cylinders are shown holding fuel injected during the engine stop procedure. However, in some examples, fuel may be injected to two or more cylinders without igniting the mixtures during an engine stop so that an air-fuel mixture may be combusted in the cylinders without injecting additional fuel to the cylinders during the first two combustion events during a subsequent engine start. Such an injection sequence may be particularly useful for engines having more than four cylinders.

The engine stops at time $T_2$ and the intake valve of cylinder number one is closed trapping an air-fuel mixture in the cylinder. In the example of FIG. 5, cylinder number one stops at the intended time where an air-fuel mixture is trapped in the cylinder to facilitate engine starting. The trapped air-fuel mixture may be applied to start the engine without injecting additional fuel to the cylinder with the trapped air-fuel mixture. In particular, starting may be initiated by simply supplying a spark to the cylinder storing the air-fuel mixture. Thus, engine cranking time may be reduced.

In this example, the time that the engine is stopped is between time $T_2$ and $T_3$. The time between $T_2$ and $T_3$ represents an amount of time greater than a threshold amount of time where the air-fuel mixture stored in cylinder number one is substantially disturbed during the engine stop period. Rather, in the example of FIG. 5, the air-fuel mixture trapped in the cylinder may be altered via seeping air and crankcases gases to the extent that combusting the cylinder mixture may not be desirable. For example, the cylinder mixture may have less capacity to generate torque, thereby leading to engine noise and vibration. Therefore, it may be desirable to skip combustion in the cylinder that received fuel during an engine stopping sequence for one cylinder cycle. The fuel ejected by the cylinder can be oxidized by catalyst in the vehicle exhaust system. Further, the ejected fuel may act to rebalance chemistry in the catalyst from lean conditions caused by air being pumped through the catalyst during engine stop.

At time $T_3$, an automatic engine start request is made. Since the air-fuel mixture in cylinder number one is disturbed by air seeping out or crankcase gases seeping into the cylinder, an ignition spark is not supplied to cylinder number one after the engine is rotated without injecting additional fuel to cylinder number one during the first cylinder cycle since engine stop. However, fuel is injected to cylinder numbers three and four at time $T_3$. Specifically, fuel is injected during open intake valve timing for cylinder number three and fuel is injected during closed intake valve timing for cylinder number four. Fuel is shown being injected during subsequent cylinder cycles for each cylinder during closed intake valve conditions. Thus, in the example of FIG. 5, a first combustion event is avoided in the cylinder where an air-fuel mixture was held during engine stop. Further, a single open valve injection of fuel into the port of a single cylinder is followed by closed valve injections to the remaining cylinders and the engine is started. Such a sequence may reduce engine emissions when the time between engine stopping and starting exceeds a threshold amount of time.

Thus, as illustrated in FIGS. 2-5, fuel may be injected to one or more cylinders without combusting the fuel during an engine stop for the purpose of assisting engine restart. However, the engine may stop in positions where intake valves of the cylinders receiving fuel during an engine stop sequence are open or closed. Further, the time that an air-fuel mixture is trapped in a cylinder of a start/stop vehicle may vary such that if the air-fuel is held longer than a threshold amount of time, combustion of the contents of the cylinder with the trapped air-fuel mixture can degrade engine starting. Therefore, the sequences illustrated in FIGS. 2-4 may be useful for improving engine starting.

It should also be noted that engine position may be determined at the time of engine stop by tracking engine position as spark and fuel are deactivated. In one example, engine position is determined and stored to memory for retrieval during the next engine start when the engine is substantially stopped. In another example, engine position may be determined at engine start after the engine begins to rotate by sensing camshaft and crankshaft positions.

Referring now to FIG. 6, a flowchart of a method for starting an engine is shown. The method of FIG. 6 may be executed via instructions in a controller of a system such as is shown in FIG. 1.

At 602, method 600 judges whether or not there has been an automatic engine stop requested. If so, method 600 indicates yes and proceeds to 604. Otherwise, method 600 indicates no and proceeds to exit. In some examples, the method of FIG. 6 only executes when a temperature of the engine is greater than a threshold amount.

At 604, method 600 suspends spark to engine cylinders in an orderly manner and fuel delivery to selected cylinders. In one example, delivery of fuel to cylinders that have started receiving fuel before the engine stop request is ceased after the cylinder cycle in which the engine stop request occurred, with the exception of the cylinder scheduled for a first combustion event after engine stop. Fuel delivery for cylinders not having received fuel during the cylinder cycle when the engine stop request is made is ceased upon the engine stop request. Spark is suspended for cylinders that hold no air-fuel mixture and spark for cylinder holding an air-fuel mixture is ceased after the air fuel mixture is combusted (e.g., see FIGS. 2-5). Method 600 proceeds to 606 after spark delivery to engine cylinder is suspended.

At 606, method 600 judges which cylinder or cylinders are scheduled to receive fuel for the purpose of restarting the engine after engine stop. The fuel is delivered so that it may be trapped in the cylinder during the engine stop period. However, since the exact engine stopping position cannot always be anticipated while the engine is turning, alternative strategies are provided to restart the engine at 616-642.

In one example, method 600 waits until engine speed is less than a threshold and then assesses engine position. Based on the engine position when engine speed is less than a threshold, a cylinder or cylinders are selected to receive a final fuel injection before engine stop. The fuel mixture is not ignited and spark remains deactivated. For example, if engine speed is less than 100 RPM and cylinder number one is presently in an expansion stroke, cylinder number one may be selected to receive a final fuel injection. In some examples, the engine may be stopped without providing fuel to trap in cylinders at 606. Method 600 proceeds to 610 after fuel is injected to one or more cylinders to promote engine restarting after engine stop.

At 610, method 600 determines engine position at engine stop. Engine position may be determined via reading teeth of a wheel that rotates with the engine crankshaft. In some examples, the wheel position may be sensed at zero engine speed. In other examples, method 600 may estimate engine stop position based on the latest available engine position information before engine stop. Method 600 proceeds to 612 after engine position is determined.

At 612, method 600 judges whether or not there is an engine restart request. The engine restart request may be automatically initiated via a controller monitoring vehicle conditions such as brake pedal condition. If method 600 judges that an engine start request is present, method 600 proceeds to 614. Otherwise, method 600 returns to 612.

At 614, method 600 engages the engine starter and determines engine stop time via summing the time from engine stop to engine rotation. Method 600 proceeds to 616 after engine stop time is determined. In some examples, method 600 also starts a timer upon engine rotation to provide time since engine stop.

At 616, method 600 judges whether or not the intake valve of the cylinder having received fuel for a first combustion event at restart during the engine stop procedure is open or closed. If the intake valve is open, method 600 proceeds to 618. Otherwise, the intake valve is determined to be closed and method 600 proceeds to 630.

At 618, method 600 judges whether or not the remaining opening duration of the intake valve of the cylinder having received fuel for a first combustion event at restart during the engine stop procedure is greater than a threshold amount and if the engine stop time has exceeded a threshold amount of time. For example, if the intake valve opening duration of the cylinder that received fuel for a first combustion event at restart during the engine stop procedure is greater than 30 crankshaft degrees and the engine has stopped for four minutes, method 600 proceeds to 620. Otherwise, method 600 proceeds to 640. When the valve opening duration is greater than a threshold amount and the engine has been stopped for more than a threshold amount of time, it may be determined that the injected fuel can enter the cylinder and that at least a portion of fuel injected during the engine stop procedure may have exited the cylinder via the open intake valve.

At 620, method 600 injects fuel to the cylinder having received fuel for a first combustion event at restart during the engine stop procedure. In other words, the cylinder scheduled for a first combustion event at engine restart receives two injections of fuel. A first fuel injection during the engine stop procedure and a second fuel injection during the engine restart. In one example, the second amount of fuel injected to the cylinder is based on time that the engine is stopped and engine temperature. Method 600 proceeds to 622 after fuel is injected to the cylinder.

At 622, method 600 begins to rotate the engine via a starter. The starter may be automatically or manually engaged. In some examples, 620 may occur after 622. Method 600 proceeds to 624.

At 624, method 600 provides a spark to the cylinder having received fuel for a first combustion event at restart during the engine stop procedure. The spark initiates the air-fuel mixture and provides a first combustion event since engine stop. Method 600 proceeds to 626 after spark is provided. In other examples, fuel may be injected to other engine cylinders before spark is provided to the cylinder having received fuel for a first combustion event at restart during the engine stop procedure to maintain combustion in firing order of the engine.

At 626, method 600 injects fuel sequentially to cylinders in the order of combustion of the engine. However, as illustrated in FIG. 2-5 some engine cylinders may receive fuel substantially simultaneously so that order of combustion may be maintained. For example, one cylinder may receive fuel at a time its intake valve is open (e.g., during an intake or compression stroke) while another cylinder receives fuel when its intake valve is closed (e.g., during an exhaust stroke). In one example, two cylinders receive fuel injected during an open intake valve time (e.g., cylinders providing the first and second combustion events since engine stop). The remaining cylinders receive fuel injected during closed intake valve timings of the respective cylinders (e.g., see FIG. 2). Method 600 proceeds to 628 after fuel is injected.

At 628, method 600 provides spark during each cylinder cycle to engine cylinders receiving fuel. The spark may be provided during compression or expansion strokes of the respective cylinders (e.g., see FIG. 2 after time $T_4$). Spark is provided sequentially after fuel is injected to engine cylinders. Method 600 exits after spark delivery to engine cylinders begins.

At 640, method 600 injects fuel to a cylinder next in combustion order from the cylinder having received fuel for a first combustion event at restart during the engine stop procedure. For example, a four cylinder engine having a firing order of 1-3-4-2 as shown in FIG. 3, where cylinder number one receives fuel during an engine stop procedure, cylinder number three is the first cylinder to receive fuel injection in response to an engine start request. Fuel is injected to cylinder number three because the opening duration of the intake valve of cylinder number one is determined to be too short for the cylinder number one to receive the injected fuel. Therefore, injection of additional fuel to cylinder number one is omitted. In this way, the cylinder does not induct excess fuel during a subsequent intake event. Method 600 proceeds to 642 after fuel is injected to the engine.

At 642, method 600 provides spark to the cylinder next in combustion order from the cylinder having received fuel for a first combustion event at restart during the engine stop procedure. However, in some examples, method 600 may provide spark to both the cylinder having received fuel for a first combustion event at restart during the engine stop procedure and the next cylinder in order of combustion. Method 600 proceeds to 626.

At 630, method 600 begins to rotate the engine via a starter. The starter may be automatically or manually engaged. In some examples, 630 may occur after 636 or 634. Method 600 proceeds to 632 after beginning engine rotation.

At 632, method 600 judges whether or not the engine stop time is greater than a threshold engine stop time. If so, method 600 proceeds to 636. Otherwise, method 600 proceeds to 634. If the engine stop time exceeds a threshold amount of time, air may seep out of or crankcase gases may seep into the engine cylinder, thereby reducing cylinder pressure during combustion and increasing engine noise and vibration.

At 636, method 600 injects fuel to the port of a cylinder next in combustion order from the cylinder having received fuel for a first combustion event at restart during the engine stop procedure. Thus, a second injection of fuel to the cylinder having received fuel for a first combustion event at restart is omitted. Method 600 proceeds to 638.

At 638, method 600 provides a first spark since engine stop to the cylinder next in combustion order from the cylinder having received fuel for a first combustion event at restart during the engine stop procedure (e.g., see FIG. 5). Thus, the cylinder having received fuel for a first combustion event at restart during the engine stop procedure is not the cylinder of where the first combustion event since engine stop occurs. However, if desired, a first spark may be provided to the cylinder having received fuel for a first combustion event at restart during the engine stop procedure. If spark is not provided to the cylinder having received fuel for a first combustion event at restart during the engine stop procedure, one or more engine cylinder air-fuel mixtures may be made leaner during engine start to offset hydrocarbons ejected from the cylinder having received fuel during the engine stop procedure. Method 600 proceeds to 626 after providing spark to the fueled cylinder.

At 634, method 600 provides spark to the cylinder having received fuel for a first combustion event at restart during the engine stop procedure. The spark provides an ignition source for the fuel that was trapped in the cylinder during the engine stop period (e.g., see FIG. 4). Since the air-fuel mixture is trapped in the cylinder for a short duration, the cylinder mixture may be suitable for combustion. Method 600 proceeds to 626 after spark is provided to the cylinder.

Thus, the method of FIG. 6 provides for a method for starting an engine, comprising: during an engine start and after an engine start request, selectively injecting fuel to a port of only a single engine cylinder having an open intake valve at a time fuel is injected to the port; and injecting fuel to each remaining engine cylinder at times when an intake valve of a cylinder receiving fuel is closed. The method includes where selectively injecting fuel to the port of a single cylinder having an open intake valve at a time fuel is injected to the port includes injecting fuel when a remaining portion of an opening duration of the intake valve is greater than a threshold number of crankshaft degrees. The method also includes where selectively injecting fuel to the port of a single cylinder having an open intake valve at a time fuel is injected to the port includes not injecting fuel when the remaining portion of an opening duration of the intake valve is less than a threshold number of crankshaft degrees. The method further includes where the remaining portion of an opening duration of the intake valve is measured from an engine stop position to when the intake valve closes.

The method of FIG. 6 further comprising stopping the engine before starting the engine and supplying fuel to the single cylinder without combusting the supplied fuel before the engine is stopped. In this way, the amount of time it takes to restart the engine can be reduced since one cylinder already contains fuel at engine start time. The method further comprises where fuel is supplied to a second cylinder during stopping the engine without combusting fuel supplied to the second cylinder before the engine is stopped. The method includes where the single cylinder is a second cylinder to enter an intake stroke during engine rotation after engine stop.

The method of FIG. 6 also includes a method for starting an engine, comprising: stopping the engine and injecting fuel to at least one cylinder without combusting the injected fuel before engine stop, the injected fuel trapped in the at least one cylinder via closed intake and exhaust valves; during an engine start and after an engine start request, selectively combusting the injected fuel via supplying a spark to the at least one cylinder of the engine. The method includes where selectively combusting the injected fuel includes not combusting the injected fuel in the at least one cylinder when the injected fuel is trapped in the at least one cylinder for less than a threshold amount of time. The method also includes where selectively combusting the injected fuel includes combusting the injected fuel in the at least one cylinder when the injected fuel is trapped in the at least one cylinder for more than a threshold amount of time.

The method of FIG. 6 further comprises injecting fuel to a port of a second cylinder of the engine at a time when an intake valve of the second cylinder is open, the injecting fuel to the port of the second cylinder for a first combustion event in the second cylinder since engine stop. Thus, at time of engine restart, a second cylinder may be selected for a first combustion event since engine stop depending on the final engine stop position.

In some examples, the method further comprises injecting fuel to each remaining cylinder of the engine at a time when an intake valve of a cylinder receiving fuel is closed. A method also includes where the engine is automatically stopped and automatically started. The method also includes where a temperature of the engine is above a first threshold when selectively combusting the injected fuel via supplying a spark to the at least one cylinder of the engine, and where the engine is not stopped automatically when the temperature of the engine is less than a second threshold temperature.

The method of FIG. 6 also provides for an engine with cylinders, comprising: stopping the engine while injecting and trapping fuel in a first cylinder without combusting the injected fuel; and during a subsequent engine start: combusting the trapped fuel via supplying a spark; port injecting fuel to only a second cylinder during an open intake valve; and port injecting fuel to each remaining engine cylinder during a closed intake valve.

As will be appreciated by one of ordinary skill in the art, method described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for starting an engine, comprising:
    during an engine start and after an engine start request, selectively injecting fuel to a port of only a single engine cylinder having an open intake valve at a time fuel is injected to the port; and
    injecting fuel to each remaining engine cylinder at times when an intake valve of a cylinder receiving fuel is closed, the single cylinder being a second cylinder to enter an intake stroke during engine rotation after engine stop.

2. The method of claim 1, where selectively injecting fuel to the port of a single cylinder having an open intake valve at a time fuel is injected to the port includes injecting fuel when a remaining portion of an opening duration of the intake valve is greater than a threshold number of crankshaft degrees.

3. The method of claim 2, where selectively injecting fuel to the port of a single cylinder having an open intake valve at a time fuel is injected to the port includes not injecting fuel when the remaining portion of an opening duration of the intake valve is less than a threshold number of crankshaft degrees.

4. The method of claim 3, where the remaining portion of an opening duration of the intake valve is measured from an engine stop position to when the intake valve closes.

5. The method of claim 1, further comprising stopping the engine before starting the engine and supplying fuel to the single cylinder without combusting supplied fuel before the engine is stopped.

6. The method of claim 5, further comprising where fuel is supplied to a second cylinder during stopping the engine without combusting fuel supplied to the second cylinder before the engine is stopped.

7. A starting method for an engine with cylinders, comprising:
    stopping the engine while injecting and trapping fuel in a first cylinder without combusting the injected fuel; and
    during a subsequent engine start:
        combusting the trapped fuel via supplying a spark;
        port injecting fuel to only a second cylinder during an open intake valve; and
        port injecting fuel to each remaining engine cylinder sequentially in order of combustion during a closed intake valve.

8. A method for starting an engine, comprising:
    during an engine start and after an engine start request, selectively injecting fuel to a port of only a single engine cylinder having an open intake valve at a time fuel is injected to the port;
    injecting fuel to each remaining engine cylinder at times when an intake valve of a cylinder receiving fuel is closed; and
    stopping the engine before starting the engine and supplying fuel to the single cylinder without combusting the supplied fuel before the engine is stopped.

9. The method of claim 8, where selectively injecting fuel to the port of a single cylinder having an open intake valve at a time fuel is injected to the port includes injecting fuel when a remaining portion of an opening duration of the intake valve is greater than a threshold number of crankshaft degrees.

10. The method of claim 9, where selectively injecting fuel to the port of a single cylinder having an open intake valve at a time fuel is injected to the port includes not injecting fuel when the remaining portion of an opening duration of the intake valve is less than a threshold number of crankshaft degrees.

11. The method of claim 10, where the remaining portion of an opening duration of the intake valve is measured from an engine stop position to when the intake valve closes.

12. The method of claim 8, further comprising where fuel is supplied to a second cylinder during stopping the engine without combusting fuel supplied to the second cylinder before the engine is stopped.

13. The method of claim 8, where the single cylinder is a second cylinder to enter an intake stroke during engine rotation after engine stop.

* * * * *